United States Patent [19]

Wheatley

[11] 4,399,977

[45] Aug. 23, 1983

[54] BALL VALVE

[75] Inventor: Charles Wheatley, Tulsa, Okla.

[73] Assignee: Barton Valve Company, Inc., Shawnee, Okla.

[21] Appl. No.: 340,209

[22] Filed: Jan. 18, 1982

Related U.S. Application Data

[63] Continuation of Ser. No. 176,037, Aug. 7, 1980.

[51] Int. Cl.³ .............................................. F16K 5/06
[52] U.S. Cl. .................................................... 251/315
[58] Field of Search ................................ 251/315, 314

[56] References Cited

U.S. PATENT DOCUMENTS

| | | | |
|---|---|---|---|
| 2,839,266 | 6/1958 | Kaiser | 251/315 |
| 2,963,262 | 12/1960 | Shafer | 251/315 |
| 3,570,811 | 3/1971 | Kruschik | 251/315 |
| 3,937,441 | 2/1976 | Baumann | 251/315 |
| 4,150,811 | 4/1979 | Condit | 251/315 |

Primary Examiner—Martin P. Schwadron
Assistant Examiner—J. R. Shay
Attorney, Agent, or Firm—Head, Johnson & Stevenson

[57] ABSTRACT

A ball valve comprising a housing having inlet and outlet ports provided a fluid passageway therethrough, a rotatable closure member disposed within the housing and interposed between the inlet and outlet ports for providing alternate open and closed positions for the valve, a rotatable valve stem secured to the closure member for moving the closure member between the open and closed positions therefor, a valve seat removably secured to the housing and engagable by the closure member in the closed position thereof, and a removable sealing member provided for the valve seat to substantially preclude leakage of fluid around the closure member in the closed position of the valve.

5 Claims, 3 Drawing Figures

BALL VALVE

This is a continuation of application Ser. No. 176,037, filed Aug. 7, 1980.

BACKGROUND OF THE INVENTION

1. Field of the Invention

This invention relates to improvements in valves and more particularly, but not by way of limitation, to a ball valve having removable sealing means and removable valve seat means.

2. Description of the Prior Art

Ball valves are in widespread usage today for providing control of fluid flo through flow lines, and the usual ball valve comprises a housing having inlet and outlet ports providing a fluid passageway through the valve whereby the fluid may flow in either direction through the housing. A rotatable closure member is disposed within the housing between the ports and is usually in the form of a ball member having a central bore extending diametrically therethrough whereby in one orientation of the ball member the bore is in alignment with the ports for providing an open position for the valve, and in another orientation of the ball member communication between the ports is precluded for providing a closed position for the valve. In some instances, the closure member is of a substantially U-shaped cross sectional configuration with the outer periphery thereof being substantially semi-spherical for engagement with suitable valve seat means in the closed position of the valve in both the open end and closed position of the closure member, with the open portion of the "U" being disposed in alignment with the ports in the open position of the valve for permitting the passage of fluid through the housing regardless of the direction of flow of the fluid. The closure member is usually operably connected with a rotatable valve stem which extends through the valve housing substantially perpendicularly with respect to the direction of fluid flow through the valve, and which is normally provided with an external operator means for transmitting rotation to the valve stem and closure member. As the closure member rotates between the open and closed positions therefor, the outer periphery thereof is in constant engagement with the valve seat and sealing means, and considerable friction and wear is generated on the seat and seal, and as a result it may be frequently necessary to replace both the valve seat and the sealing means. In the presently available valves of this type, the replacement of the valve seat and sealing means usually presents a problem and is time consuming and expensive in that a considerable amount of disassembly is often necessary to perform the replacement operation.

SUMMARY OF THE INVENTION

The present invention contemplates a ball valve particularly designed and constructed for facilitating the replacement of both the sealing means and valve seat. The novel valve comprises a valve body of substantially cylindrical configuration which is adapted to be installed or secured between a pair of flange fittings by means of suitable bolt means. A rotatable closure member is disposed within the valve body and is operably connected with the usual valve stem for rotation between open and closed positions within the valve for controlling the flow of fluid therethrough in the usual manner. A valve seat is removably secured to one end of the valve body conterminous with the fluid passageway extending therethrough, and is securely retained in position by engagement with the adjacent flanged fitting. The valve seat is of a sectional construction, and a sealing means is interposed between the sections of the valve seat for facilitating access thereto when the sealing means becomes worn and is in need of replacement. When the valve seat and/or sealing means is to be replaced, the bolts securing the flanged fittings in assembly with the valve body may be released whereby the entire valve may be quickly and easily removed from disposition between the fittings, and ready access to the valve seat is thus provided. The valve seat and sealing member may be removed and replaced as a complete unit or assembly, or in the event only the seal member is in need of replacement, the sectional construction of the valve seat permits ready access to the seal member for replacement thereof. The entire valve may be reinserted to the position between the flanged fittings upon completion of the replacement operation and the bolts may be restored to the normal clamping position for securing the valve between the flanged fittings. The novel ball valve is simple and efficient in operation and economical and durable in operation.

DETAILED DESCRIPTION OF THE PREFERRED EMBODIMENT

Figure 2:
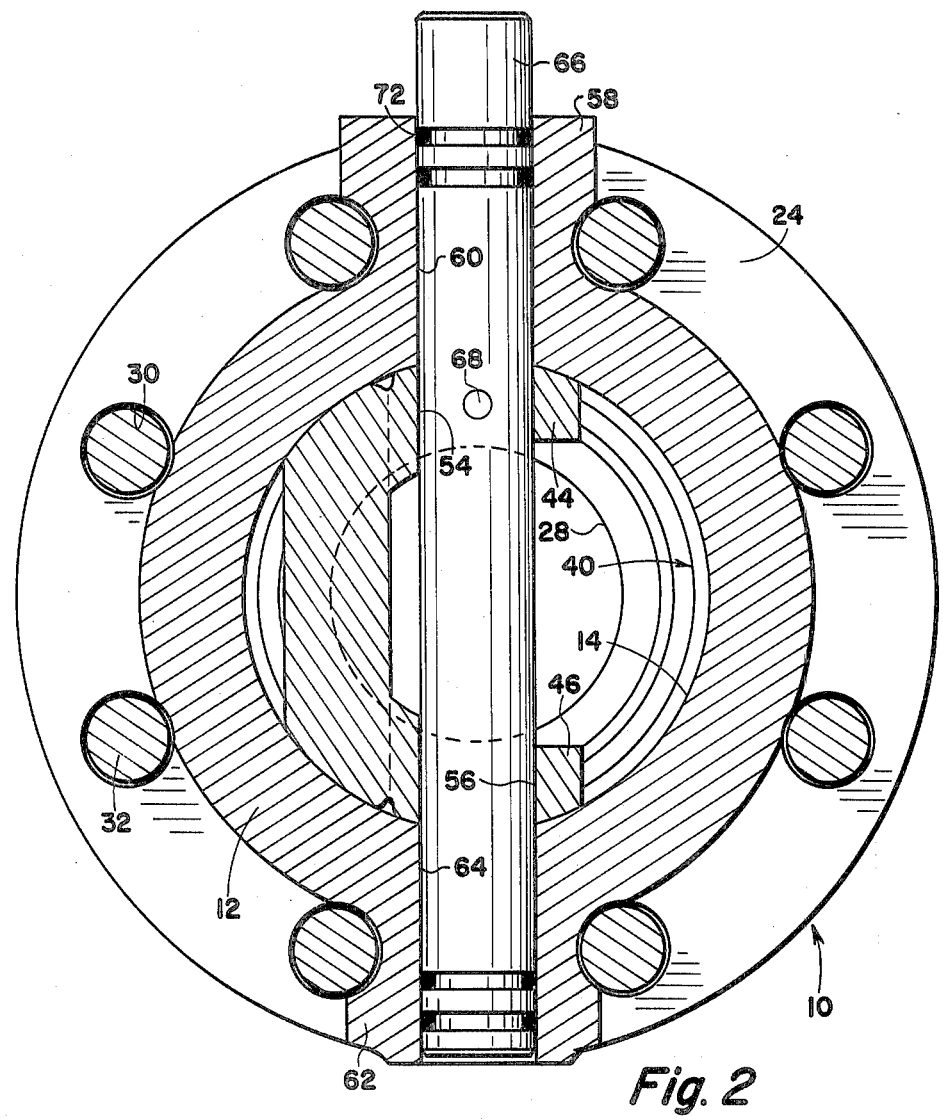
FIG. 2 is a sectional elevational view of a ball valve embodying the invention and taken at right angles with respect to FIG. 1, and illustrates an open position for the valve.
Figure 3:
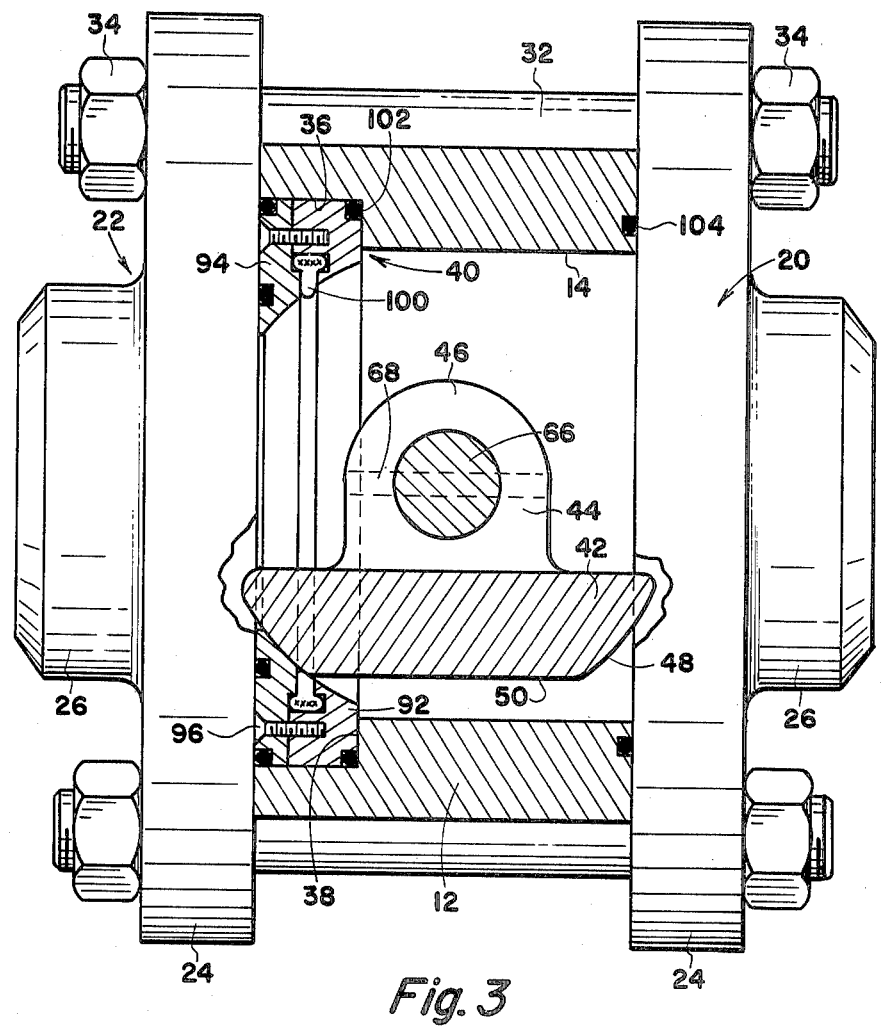
FIG. 3 is a view taken on line 3—3 of FIG. 2.

Referring to the drawings in detail, reference character 10 generally indicates a ball valve comprising a substantially cylindrical valve body 12 having a centrally disposed bore 14 extending longitudinally therethrough to provide a fluid passageway for the valve. The opposite ends 16 and 18 of the body 12 are preferably flat for receiving flanged bittings 20 and 22 thereagainst, respectively, in a metal to metal sealing engagement, as is well known. The flanged fittings 20 and 22 are substantially identical but oppositely disposed and each comprise a circumferential flange 24 having the outer face thereof flat for the metal to metal engagement with the respective end of the body 12. A centrally disposed sleeve 26 extends axially outward from each flange 24 in a direction away from the valve body 12, and a central bore 28 extending longitudinally therethrough for providing communication with the bore 14 of the body 12 for a purpose as will be hereinafter set forth. The flanges 24 are provided with a plurality of circumferentially spaced bores 30 adapted to be positioned in substantial axial alignment with the bores 30 of the oppositely disposed flange 24 for receiving clamping bolts 32 therethrough. The bores 30 are positioned radially outboard of the outer periphery of the body 12, as particularly shown in FIGS. 2 and 3 whereby the innermost portion of the outer periphery of the bolts 32 define a circle of a size very close to the outer circumferential size of the body 12 for facilitating alignment between the body 12 and flanges fittings 20 and 22, as is well known. Of course, suitable lock nuts 34 may be provided for the bolts 32 for securely locking the flanges 20 and 22 in position against the outer faces or ends 16 and 18 of the body 12.

Figure 1:
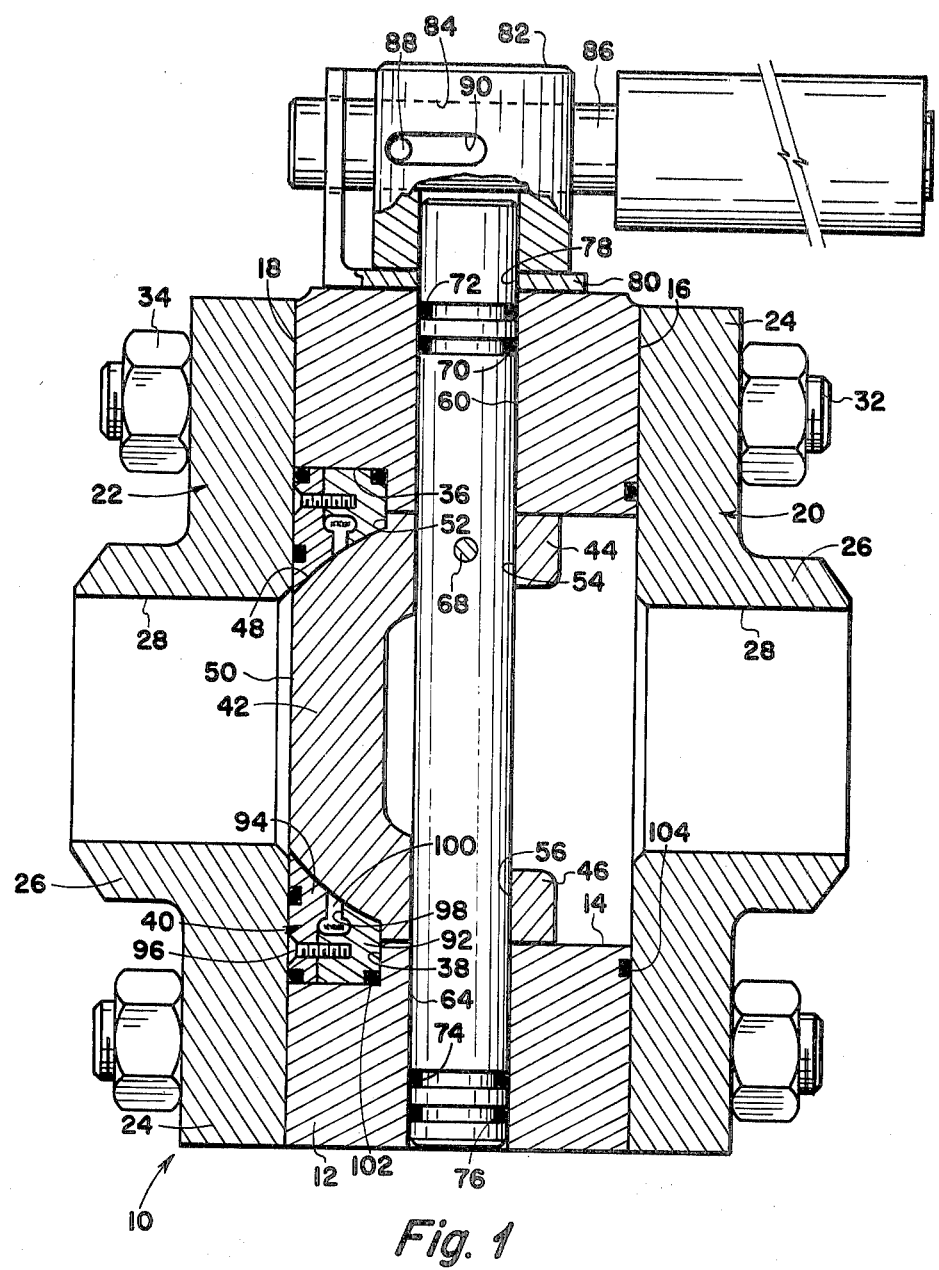
FIG. 1 is a sectional elevational view of a ball valve embodying the invention, with portions shown in elevation for purposes of illustration, and depicts a closed position for the valve.

The passageway 14 of the body 12 is enlarged at 36 to provide an annular shoulder 38 for receiving a sectional valve seat assembly 40 thereagainst. A closure member 42 is rotatably disposed within the passageway or bore 14, and is of a substantially U-shaped cross sectional configuration having a pair of spaced outwardly extending leg members 44 and 46 at the open end of the "U" and a substantially spherical portion 48 on the outer periphery of the closed end of the "U". The outer end of the closure member 42 is preferably flat, as shown at 50, and is preferably disposed in substantial planar alignment with the end or face 18, as particularly shown in FIG. 1. An annular shoulder 52 extends around the outer periphery of the closure member 42 at the juncture between the spherical portion 48 and the legs 44 and 46, and is preferably disposed in substantial alignment with the shoulder 38 for receiving the valve seat assembly 40 thereagainst. The legs 44 and 46 are provided with bores 54 and 56 disposed in substantial axial alignment for a purpose as will be hereinafter set forth.

The body 12 is provided with a first radially outwardly extending boss member 58 having a central bore 60 extending therethrough into communication with the bore 14. A second radially outwardly extending boss 62 is provided on the body 12 oppositely disposed with respect to the boss 58 and provided with a central bore 64 extending therethrough in substantial axial alignment with the bore 60. The closure member 42 is interposed between the bores 60 and 64 in such a manner that the bores 54 and 56 of the legs 44 and 46 are in substantial axial alignment with the bores 60 and 64. A rotatable valve stem 66 extends through the bores 60, 54, 56, and 64, and the closure member 42 is secured to the valve stem 66 in any suitable manner, such as by a pin 68 whereby rotation of the shaft or stem 66 about its own longitudinal axis transmits rotation to the closure member 42 within the bore 14 as will be hereinafter set forth in detail. Suitable sealing means, such as a pair of spaced O-rings 70 and 72 are interposed between the stem 68 and the bore 60 for precluding leakage of fluid therebetween, and a similar sealing means, such as a pair of spaced O-rings 74 and 76 are interposed between the stem 66 and the bore 64 for precluding leakage of fluid therebetween.

The valve stem 66 may be rotated about its own longitudinal axis in any suitable or well known manner, and as shown herein one end of the stem 66 extends beyond the boss 58 and through a bore 78 provided in an angle-bracket member 80. A cap member 82 is suitably secured to the outer end of the stem 66 and is provided with a transversely extending bore 84 for slidably receiving a shaft 86 therethrough. The shaft 86 is slidably secured within the bore 84 in any suitable manner, such as by radially outwardly extending pin means 88 slidably engaged with a slot 90. In addition, the outer end of the shaft 86 is in alignment with a bore (not shown) provided in the angle-bracket 80 whereby the shaft 86 may be inserted therethrough for holding the shaft 86 in a selected position as will be hereinafter set forth.

The valve seat assembly 40 comprises a first annular member 92 adapted to be disposed against the shoulders 38 and 52, and a second annular member 94 secured to the member 92 in any suitable manner, such as by a plurality of screws 96. The abutting edges or sides of the annular member 92 and 94 are provided with complementary recesses forming a groove 98 of substantially T-shaped cross sectional configuration for receiving a suitable sealing ring 100 therein of a cross sectional configuration corresponding to the configuration of the recess 98. A sealing ring of this type is shown in my prior U.S. Pat. No. 2,886,284, issued May 14, 1959, and entitled "Flanged Sealing Ring". Whereas the outer periphery of each annular member 92 and 94 is substantially cylindrical, it is to be noted that the inner, peripheries thereof are substantially spherical corresponding to the configuration of the spherical portion 48 of the closure member 42. Thus, the outer periphery of the closure member 42 is constantly in engagement with the inner periphery of the valve seat assembly 40 during both the opening and closing of the valve. Of course, it is preferable to provide suitable sealing members, such as O-rings 102, between the valve seat assembly 40 and the body 12 and flanged fitting 22 for precluding leakage of fluid therebetween, as is well known. In addition, it is preferable to provide a suitable sealing means, such as an O-ring 104 between the end 16 of the body 12 and the inner surface of the flanged fitting 20 for precluding leakage of fluid therebetween.

In use, the valve seat assembly 40, having the sealing member 100 secured therein, is disposed in the enlarged bore portion 36 and against the shoulders 38 and 52, and the valve body 12 may then be inserted into a position between the spaced flanged fittings 20 and 22. The bolts 32 may be inserted through the respective aligned bores 30 and the lock nuts 34 may be secured to the bolts for securely clamping the valve body 12 between the fittings 20 and 22. The outer end of each fitting 20 and 22 may then be secured to a suitable flow line (not shown) in any suitable manner, such as by welding, or the like. When the valve 10 is to be closed for precluding the flow of fluid through the valve, the hands or shaft 86 may be released from engagement with the angle-bracket 80, and moved in the proper direction for rotating the valve stem 66 in a manner for moving the closed end of the closure member 42 into alignment with the bore 28 of the fitting 22, as particularly shown in FIG. 1. In this position, the valve seat 40 and sealing member 100 will bear against the outer periphery of the closure member for precluding flow of fluid therearound, and since the port 28 of the fitting 22 is closed, the flow of fluid through the valve 10 is precluded. The outer end of shaft member 86 may then be inserted through the bore (not shown) of the angle-bracket 80 for retaining the shaft in the position of orientation for holding the closure member 42 in the closed position.

In order to open the valve 10, the shaft 46 may be removed from engagement with the angle-bracket member 80 and moved in the proper direction for rotating the stem 66 and closure member 42 in such a manner as to remove the closed end of the closure member from alignment with the ports 28, and to a position completely away from the flow passageway between the ports 28 of the fittings 20 and 22. The outer end of the stem 86 may then be inserted in another bore (not shown) provided in the angle-bracket 80 in substantially perpendicular orientation with respect to the first bore, thus retaining the shaft 86 in the position for holding the closure member 42 away from the flow passageway.

When it is necessary to replace the valve seat 40 or sealing member 100 for any reason, the flow through the valve 10 must be interrupted in any suitable manner, such as by closing or isolating the portion of the flow line wherein the valve is installed, as is well known. A sufficient number of the bolts 32 may be released and removed from engagement with the flange fittings 20 and 22 whereby the body 12 may be removed from disposition between the fittings. When the body 12 has been removed from the fittings 20 and 22, the valve seat assembly 42 is readily accessible and may be readily removed from the body 12 and replaced with an entire new valve seat assembly, if required. Alternately, the annular member 94 may be removed from the annular member 92 by release of the screws 96, and the sealing member 100 may be removed and replaced by a new seal, whereupon the annular member 94 may be again secured to the annular member 92, and the valve body 12 may be reinserted to the proper position between the flanged fittings 20 and 22. It will be readily apparent that the positioning of the bolts 32 facilitates the proper alignment of the valve body 12 with the fittings, and the bolts 32 which were removed for freeing the body 12 may be replaced. The flow through the flow line may then be re-established.

From the foregoing it will be apparent that the present invention provides a novel ball valve adapted to be interposed between a pair of flanges fittings installed within a flow line, or the like, and having removable valve seat means and removable sealing means. The valve body may be easily removed from position between the fittings whereby ready access is made for the valve seat assembly. The entire valve seat assembly may be readily and quickly removed and replaced without any further disassembly of the valve itself. In addition, the valve seat assembly is of a sectional construction for easy access to the sealing member for replacement thereof as necessary.

Whereas the present invention has been described in particular relation to the drawings attached hereto, it should be understood that other and further modifications, apart from those shown or suggested herein may be made within the spirit and scope of this invention.

What is claimed is:

1. A ball valve comprising a valve body for removable installation between a pair of substantially identical oppositely disposed flanged fittings and having a fluid passageway extending therethrough, sectional valve seat means removably secured on the valve body coterminous with one end of the fluid passageway, a rotatable closure means disposed in the fluid passageway and having the outer periphery thereof in constant engagement with the valve seat means, said closure means having fluid passageway means for alignment with the fluid passageway of the valve body in one position of the closure means for providing an open position for the valve and having a closed end for alignment with the fluid passageway of the valve body in another position of the closure member for providing a closed position for the valve, and seal means removably secured between the sections of said valve seat means whereby the closure means engages the valve seat means both upstream and downstream of the seal means in the closed position of the valve and only outside of the seal means in the open position of the valve.

2. A ball valve as set forth in claim 1 wherein the valve seat means is of a sectional construction, and said seal means is removably secured between the sections of said valve seat means.

3. A ball valve as set forth in claim 1 wherein the fluid passageway means of the valve body is enlarged in the proximity of one end thereof to provide an annular shoulder for receiving the valve seat means thereagainst, and one of said flanged fittings engages said valve seat means for removably securing the valve seat means against said annular shoulder.

4. A ball valve as set forth in claim 3 wherein said valve seat means comprises a first annular element removably disposed against said annular shoulder, a second annular element removably secured to said first annular member, and said seal means is interposed between said first and second annular elements.

5. A ball valve as set forth in claim 4 wherein the abutting sides of said annular elements are provided with complementary recesses providing a recess for receiving said seal member therein.

* * * * *